United States Patent
Carroll

[19]

[11] Patent Number: 5,814,921
[45] Date of Patent: Sep. 29, 1998

[54] FREQUENCY MULTIPLYING PIEZOELECTRIC GENERATORS

[75] Inventor: Charles B. Carroll, Trenton, N.J.

[73] Assignee: Ocean Power Technologies, Inc., West Trenton, N.J.

[21] Appl. No.: 404,186

[22] Filed: Mar. 13, 1995

[51] Int. Cl.$^6$ ............................. H01L 41/08; F03C 2/08
[52] U.S. Cl. ............................. 310/339; 290/53; 60/497
[58] Field of Search .................... 310/338, 339; 322/2 R; 290/53; 60/497

[56] References Cited

U.S. PATENT DOCUMENTS

| | | | |
|---|---|---|---|
| 2,309,703 | 2/1943 | Lovell et al. | 310/339 |
| 3,336,529 | 8/1967 | Tygart | 324/70 |
| 3,457,463 | 7/1969 | Balamuth | 310/339 |
| 4,110,630 | 8/1978 | Hendel | 290/53 |
| 4,317,047 | 2/1982 | Almada | 290/53 |
| 4,404,490 | 9/1983 | Taylor et al. | 310/339 |
| 4,685,296 | 8/1987 | Burns | 60/497 |

FOREIGN PATENT DOCUMENTS

| | | | |
|---|---|---|---|
| 1368476 | 1/1988 | U.S.S.R. | 290/53 |
| 1592569 | 9/1990 | U.S.S.R. | 290/53 |

*Primary Examiner*—Thomas M. Dougherty
*Attorney, Agent, or Firm*—Michael Y. Epsten, Esq.; Henry I. Schanzer, Esq.

[57] ABSTRACT

Piezoelectric electrical generators comprise cantilevered beams of piezoelectric material, cross sections of the beams preferably being triangular and of increasing area from free end to fixed end. Arrays of spaced apart beams are disposed in overlapping, interdigitated relationships with arrays of cams, and the cam arrays are moved relative to the beam arrays for causing engagement and deflection of the beams by the cams for the generation of electrical energy. One system comprises a raft floating on the surface of an ocean. Cam arrays are suspended from the raft for interaction with vertically extending beam arrays mounted on the ocean floor beneath the raft. Relative vertical movements are caused by passing surface waves. In another system, beam arrays are suspended from an above surface structure, e.g., an oil drilling ocean platform, and the beam arrays extend towards and interact with cam arrays mounted on the upper surface of a floating raft.

11 Claims, 8 Drawing Sheets

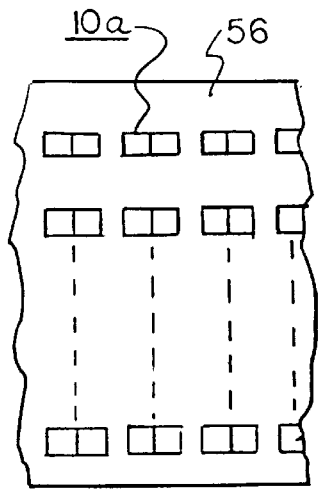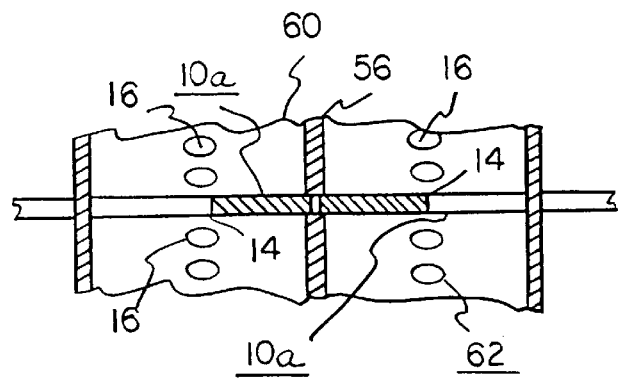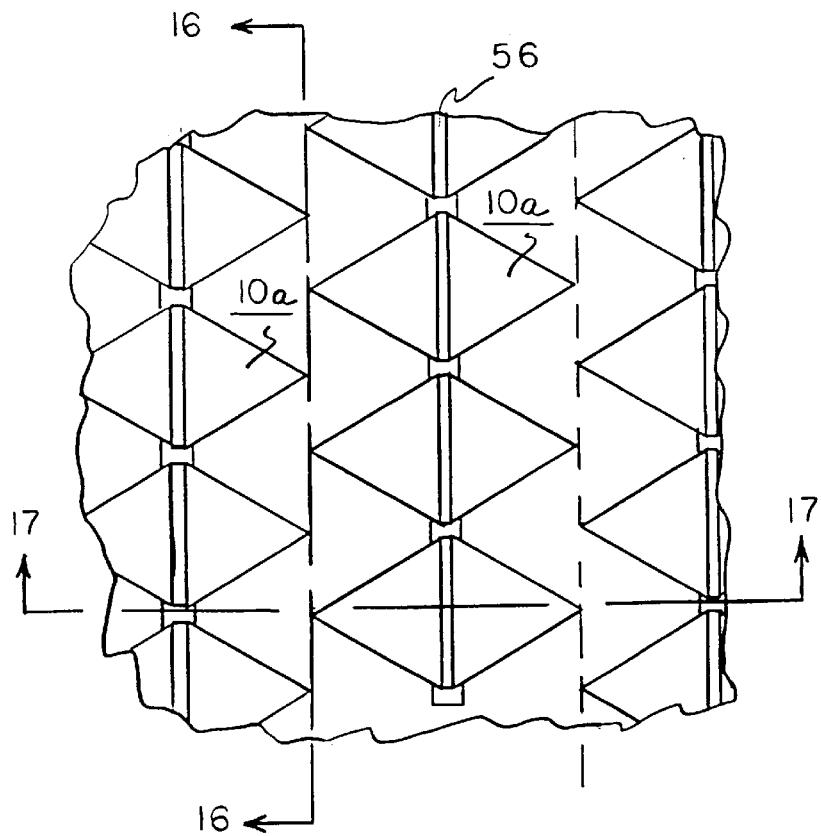
FIG. 16
FIG. 17
FIG. 15

FREQUENCY MULTIPLYING PIEZOELECTRIC GENERATORS

BACKGROUND OF THE INVENTION

This invention relates to piezoelectric power generators, and particularly, but not exclusively, to such generators for converting the mechanical energy of surface waves on bodies of water to electrical energy.

In recent years, there have been a number of disclosures of means for converting mechanical energy, particularly from moving streams of water, ocean surface waves, and the like, into electrical energy using piezoelectric generators. U.S. Pat. Nos. 4,404,490 (Burns and Taylor) and 4,685,296 (Burns), the subject matter of which is incorporated herein by reference, disclose, for example, systems for converting the energy of ocean surface waves to electrical energy. In these systems, piezoelectric materials are anchored to the ocean floor and are either suspended from a raft or float at a preselected height above the ocean floor. The piezoelectric materials are strained and de-strained, for producing electricity, in direct response to the passage of ocean waves.

A problem with ocean waves, however, is that they occur relatively slowly, e.g.; around 0.1 Hz for deep water waves, and for efficient extraction of the energy from the waves, relatively large piezoelectric elements are used which are subjected to large straining forces at a slow frequency. It appears, however, that this is not the best mode of operation of piezoelectric materials because, for example, large straining forces tend to permanently stretch the materials and to reduce the operating lifetime of the materials. Also, the larger the elements used and the larger the straining forces employed, the larger are the floats and anchoring systems required.

SUMMARY OF THE INVENTION

Two arrays having fixedly spaced apart elements are provided including means for causing relative displacements between the two arrays. In one embodiment, for example, one array extends vertically upwardly from an ocean floor or from some fixed structure and the other array is suspended from or mounted on a float. The elements on one of the arrays are piezoelectric members, e.g., cantilevered beams, and the elements on the other of the arrays are displacement members, e.g., cams. The two arrays are disposed in side-by-side relationship with the elements of the two arrays being in interdigitated, overlapping relationship with one another. In response to a vertical movement of the float, e.g., an upward movement, the cam members are brought into contact with immediately adjoining piezoelectric members thereby straining them for the generation of electrical energy. Depending upon the dimensions of the arrays and the relative displacements therebetween, each cam member passes beyond the immediately adjoining piezoelectric member and engages one or more piezoelectric members disposed successively in line with the initially engaged piezoelectric member. The process is repeated but in reverse sequence in response to a downward movement of the float.

All the cam members can simultaneously engage all the piezoelectric members or, alternatively, a first group of cam members can simultaneously engage a corresponding first group of piezoelectric members during first time periods alternating with second time periods when a second group of cam and piezoelectric members are simultaneously engaging one another.

In a preferred embodiment, the piezoelectric elements comprise cantilevered beams having a triangular cross-section.

DESCRIPTION OF THE DRAWING

The drawings are schematic and not to scale.

FIG. 15 is a plan view of a system including adjacently disposed multiple beam arrays;

FIGS. 16 and 17 are cross-sections taken along lines 16—16 and 17—17 in FIG. 15, respectively;

DESCRIPTION OF PREFERRED EMBODIMENTS OF THE INVENTION

Figure 1A:
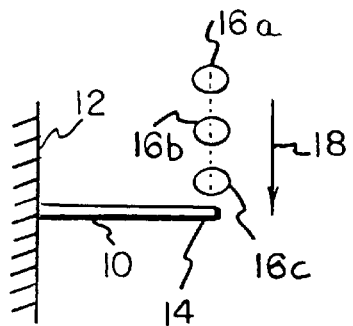
FIGS. 1A–1D illustrate the successive deflections of a cantilevered beam, piezoelectric generator by an array of cams in accordance with one embodiment of this invention.
Figure 1B:
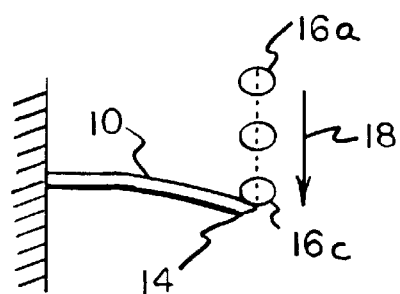

A concept utilized in various embodiments of the invention is illustrated schematically in FIG. 1A–1D. Therein is shown a cantilevered, resilient beam 10 of a piezoelectric material fixedly mounted at one end 12 to a support structure. Disposed adjacent to the extending end 14 of the beam is an array of cams 16 moveable as a unit in the direction of the arrow 18 and along a path intersecting the beam end 14. When the lowermost cam 16c engages (FIG. 1B) the end 14 of the cantilevered beam 10, the beam is deflected and bent. The bending causes stretching of the upper portions of the beam and squeezing (contraction) of lower portions. Such stretchings and squeezings (straining) of the piezoelectric material of the beam cause, as known, the generation of electrical energy which can be collected by means of electrodes (not shown) on the upper and lower surfaces of the beam.

Figure 1C:
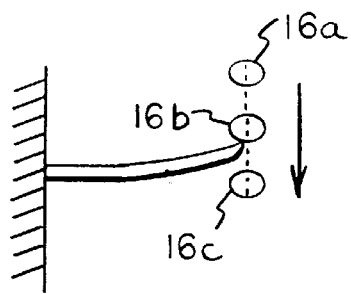
Figure 1D:
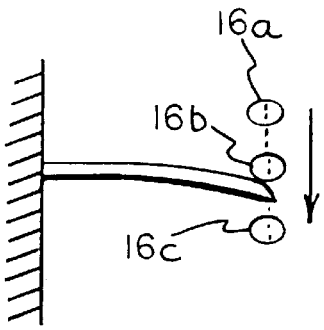

With continued downward movement of the lowermost cam 16c, the downwardly deflected beam end 14 eventually disengages from the lowermost cam and the resilient beam snaps upwardly to eventually, as shown in FIG. 1C, engage the downwardly descending middle cam 16b. Continued downward movement of the middle cam 16b repeats the process which is then further repeated by engagement of the topmost cam 16a with the resilient beam.

The process can be endlessly repeated dependent upon the number of cams present, and can be duplicated in the reverse direction, i.e., with the cams moving upwardly relative to the beam. Also, endless, single direction repetition, with a definite number of cams can be obtained by mounting an array of cams 16 around the circumference of a large, rotating wheel rotated by a stream of water or the like.

As mentioned, deflection and straining of the piezoelectric beam causes the generation of electrical energy, and such generation occurs in response to all changes in straining of the material whether caused by a forced deflection of the beam by a cam or during free vibrations of the beam after disengagement of the beam from the cam. Basically, energy is being stored in the beam as it is being deflected, and the energy is converted to heat and electrical energy in response to varied straining of the beam. The parameters of operation, e.g., the amount of beam deflection and the spacing between successive cams, are a function of the piezoelectric material used and the construction of the cantilevered beam. These parameters are optimized by experimentation but, even in the absence of optimum designs, the repetitively deflected piezoelectric material beam will generate electricity.

By way of example, it is noted that a triangular PVDF cantilever beam that is 1 foot wide, 1 foot long, and 0.4 inches thick will deflect about 3.8 inches at its end point when loaded with 90 pounds at its end point. A load of 130 pounds causes a deflection of about 5.5 inches. The resulting surface strains are about 1.6% and 2.3% respectively. These are suitable conditions although strains of 4% are permissible. For these sizes, the cams may be spaced about 6 to 10 inches apart. This allows a first cam to fully deflect a beam, while providing space for the beam to snap back prior to being engaged by a second cam.

Figure 2:
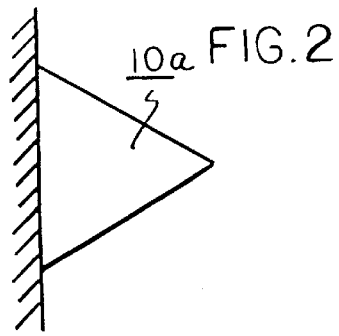
FIG. 2 is a plan view of a cantilevered beam having a triangular cross-section.
Figure 3:
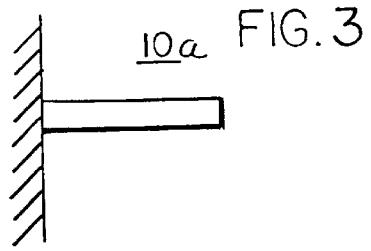
FIG. 3 is a side elevation of the beam shown in FIG. 2.
Figure 4:
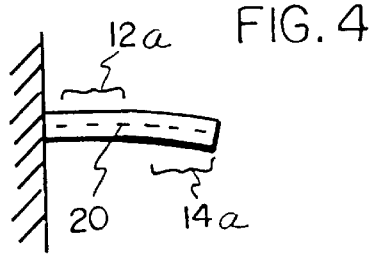
FIG. 4 is a view similar to that of FIG. 3 but illustrating deflection of the beam.

The mechanics of beams are extensively developed. With a cantilevered beam depressed by a force applied against the free end, the bending moment is lowest at the free end and increases with distance from the free end. The bending moment produces stress that also is lowest at the free end, and increases with distance from the free end. Because strain is directly proportional to stress, the straining is lowest at the free end and increases along the beam to a maximum at the beam fixed end. For most efficient use of the piezoelectric material present in the beam, it is preferred that the straining be uniform throughout all the piezoelectric material. To this end, the piezoelectric material beam has a triangular cross-section such that the cross-sectional area of the beam increases in a direction from the free end to the fixed end. An example of such a triangular beam is shown in FIGS. 2 and 3 which are plan and side views of a beam 10a, respectively. Thus, when the beam 10a is deflected, resulting (FIG. 4) in a straining of the beam along a forward portion 14a of the beam which is the same as along a rearward portion 12a of the beam (such similar strainings being associated with different amounts of bending moment being resisted in the differently sized portions), the amount of piezoelectric material available at the forward portion 14a for absorption of the smaller amount of available energy is less than that available at the rearward portion for absorbing the greater quantity of available energy.

Figure 6:
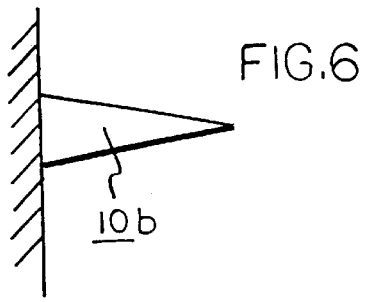
FIGS. 5 and 6 are views similar to FIGS. 2 and 3, respectively, but showing a different triangular cross-section beam.
Figure 5:
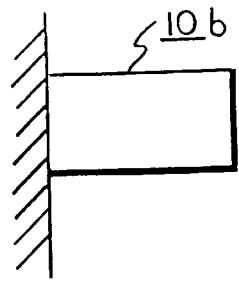

FIGS. 5 and 6 show plan and side views, respectively, of a beam 10b also having a preferred triangular cross-section, but where the thickness of the beam 10b varies rather than the width as with the beam 10a shown in FIGS. 2 and 3.

Figure 7:
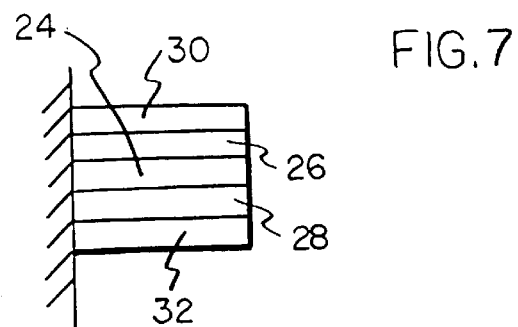
FIGS. 7 and 8 show vertical cross-sections through beams of the type shown in FIG. 3.

As mentioned, when a cantilevered beam is downwardly deflected, the upper surface is stretched while the lower surface is contracted. Obviously, a mid-plane 20 (FIG. 4) is neither stretched nor contracted, and any piezoelectric material disposed along such mid-plane is wasted in the sense that, by not being variably strained, it will not generate electricity. Accordingly, and depending upon the particular materials and the application involved, it is generally preferable to use a laminate-type beam, e.g., one comprising (FIG. 7) a core layer 24 of a non-piezoelectric material, e.g., fiber glass or beryllium copper with known modulus of elasticity. The properties of the core layer can be arranged to maintain the beam integrity without requiring an undue amount of force to bend. A layer of tin or aluminum or a known conductive ink, e.g., containing particles of silver or carbon black, acts as an electrode and is sandwiched between the core 24 and two layers 26 and 28 of a piezoelectric material. FIG. 7 also shows electrodes 30 and 32 contacting the outer surfaces of the layers 26 and 28, respectively.

Figure 8:
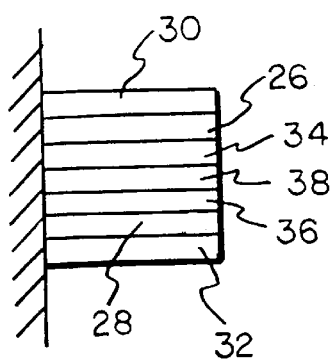

Also, because the two piezoelectric layers 26 and 28 are being strained in opposite directions during any beam deflection, i.e., one layer being compressed while the other layer is being stretched, each layer will be generating a different polarity voltage relative to the central layer 24. For electrically isolating the two layers 26 and 28, as may be desirable depending upon how the generator is being used, the core can comprise (FIG. 8) two electrically conductive layers 34 and 36 separated by a thin insulating layer 38, e.g., of plastic. A preferred arrangement simply turns over one of the piezoelectric layers prior to lamination. This causes the polymer surfaces with the same polarity to adjoin and an insulator is not needed.

In one embodiment, a total of 100 individually electroded PVDF layers are used, 50 layers on each side of a central layer of beryllium copper of 200 mils thickness. Each PVDF layer has a thickness of 110 $\mu$m, and the PVDF layers are bonded to one another and to the central layer using a known flexible bonding material, e.g., a known epoxy such as a 1 mil thick layer of DENSIL, manufactured by FLEXCON Corp.

Figure 10:
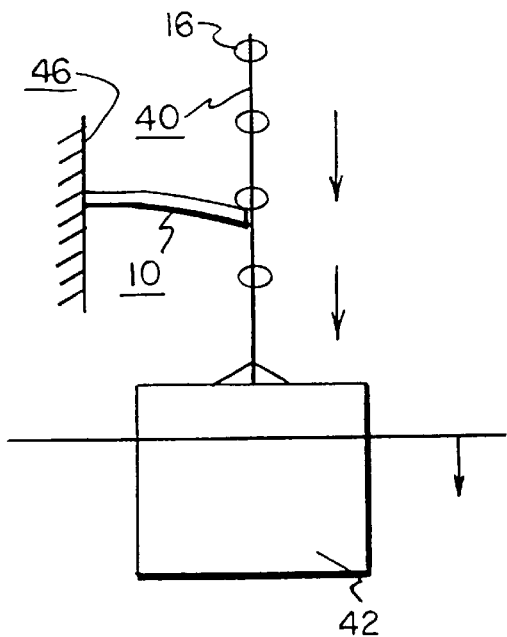
FIGS. 9–12 illustrate different aspects of operation of a system including a float mounted cam array.
Figure 9:
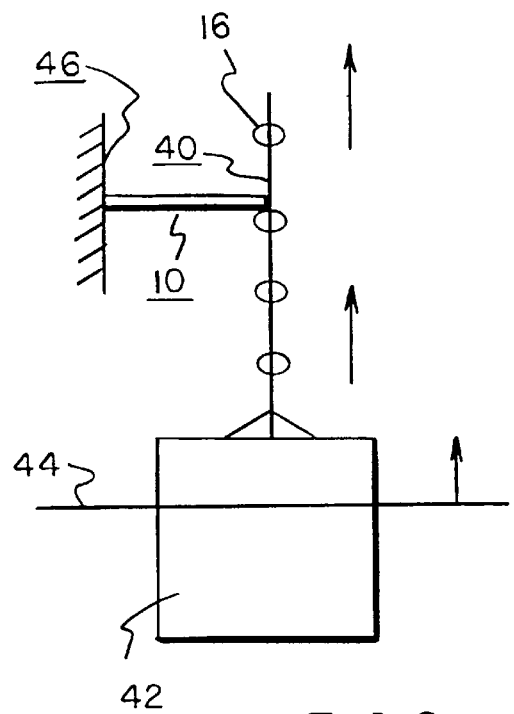

FIGS. 9 and 10 show, schematically, one arrangement for providing relative movements between an array of cams 16, such as shown in FIGS. 1A–1D, and a cantilevered beam 10. An array 40 of cams 16 is mounted on a raft 42 floating on the surface 44 of a body of water. A cantilevered beam 10 is shown mounted on a fixed structure 46 which can comprise, for example, an ocean drilling platform standing on the floor of the water body. As the raft 42 moves upwardly (FIG. 9), as by being lifted by a passing wave on the water surface, the cams 16 sequentially engage and upwardly deflect the beam 10 for causing the beam 10 to generate electrical energy. When the crest of the wave has passed, the raft 42 begins to descend, as shown in FIG. 10, and the successive cams 16 downwardly deflect the beam for generating electricity.

While FIGS. 9 and 10 show the cam array 40 mounted on the raft 42, the mountings of the cam array 40 and the beam 10 can be reversed with the beam 10 being mounted on the raft 42, e.g., on a vertical mast, and the cam array 40 being mounted on the fixed support 46.

Of significance is that for each passing wave, occurring at a relatively low frequency, the beam 10 is deflected many times depending upon the dimensions of the passing wave. In FIGS. 9 and 10, for example, showing four cams 16, and assuming a wave having an amplitude, from crest to trough, at least equal to the distance between the uppermost and lowermost cams of the cam array 40, the beam is deflected a total of eight times per passing wave.

In the afore-cited patents to Burns, arrangements are shown where the piezoelectric elements are stretched and de-stretched only once per passing wave. Assuming, in the beam 10, an amount of piezoelectric material equal to that in the Burn's elements and subject to the same straining, the beam element 10 would theoretically generate, per wave, eight times the power generated by the Burns element. This follows because the beam 10, in the present illustration, is strained and de-strained eight times against the single straining and destraining in the referred to Burns arrangement.

In actuality, such a direct comparison is not possible because, while pulling upon a suspended element, as in Burns, provides a uniform stressing of the entire piezoelectric element, bending a beam produces non-uniform stressing and, to some extent, reduces the amount of straining that can be safely produced in comparison with the simple linear stretching of a piezoelectric element. Accordingly, the aforementioned advantage of eight times power output for the same amount of material is unlikely, but some increases in power output are obtained. In addition, the lower strain in the piezoelectric element, with increased power output, can provide a longer operating lifetime for the element.

Additionally, by applying a force against the end of a cantilevered beam, as herein described, the deflecting force is magnified in proportion to the length of the beam, which acts as a lever. Accordingly, the amount of force necessary to deflect the beam, hence the size of the raft 42 (FIG. 9) necessary to produce the force, can be selected as desired. The force, and therefore the raft size, to produce an amount of electricity is less than with the Burns arrangement. The size of the raft is further reduced, in comparison with the Burns arrangements where piezoelectric elements are suspended from, and supported by, the raft, by mounting and supporting the weight of the piezoelectric beam (or beams) not on the raft but on the ocean floor or other structures.

Figure 11:
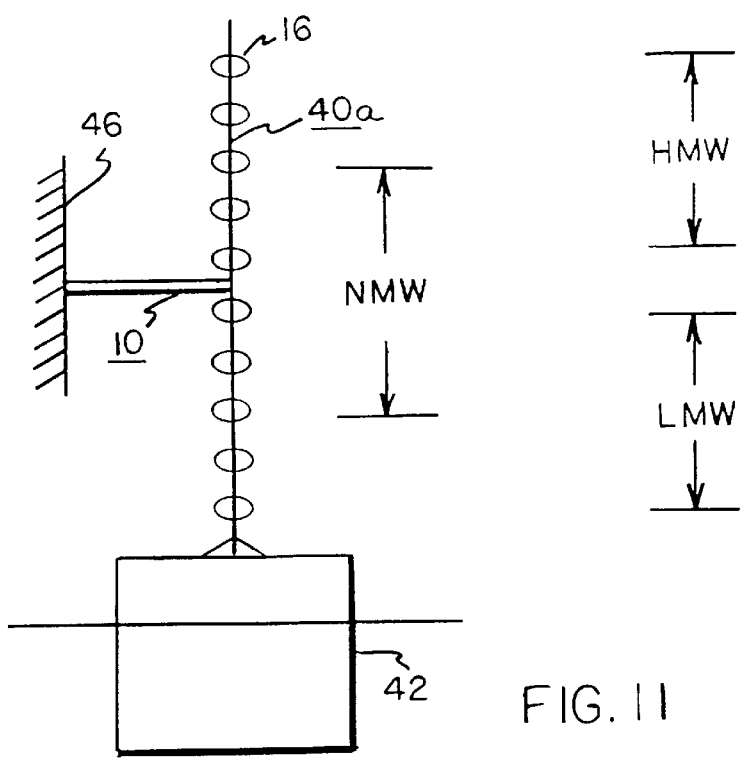

Other advantages arise from the independent mounting of the beam and the beam deflecting cams. One such advantage is illustrated in FIG. 11 where a cam array 40a is shown having ten cams 16 rather than the four cams shown in FIG. 10. The system shown in FIG. 11 functions similarly as the system shown in FIG. 10 with the exception that six cams 16 normally engage and deflect the beam 10 in response to passing waves raising and lowering the raft 42. The six cams so engaged are those identified by the legend NMW, which stands for normal mean water (level). Conversely, with changes in mean water levels, e.g., in response to tides, different groups of cams, identified by the legends HMW (high) and LMW (low), engage the beam 10. Thus, regardless of the mean water level, the system shown in FIG. 11 automatically adjusts (on a continuous basis) for level changes and electrical energy is generated on a continuous, uninterrupted basis.

Figure 12:
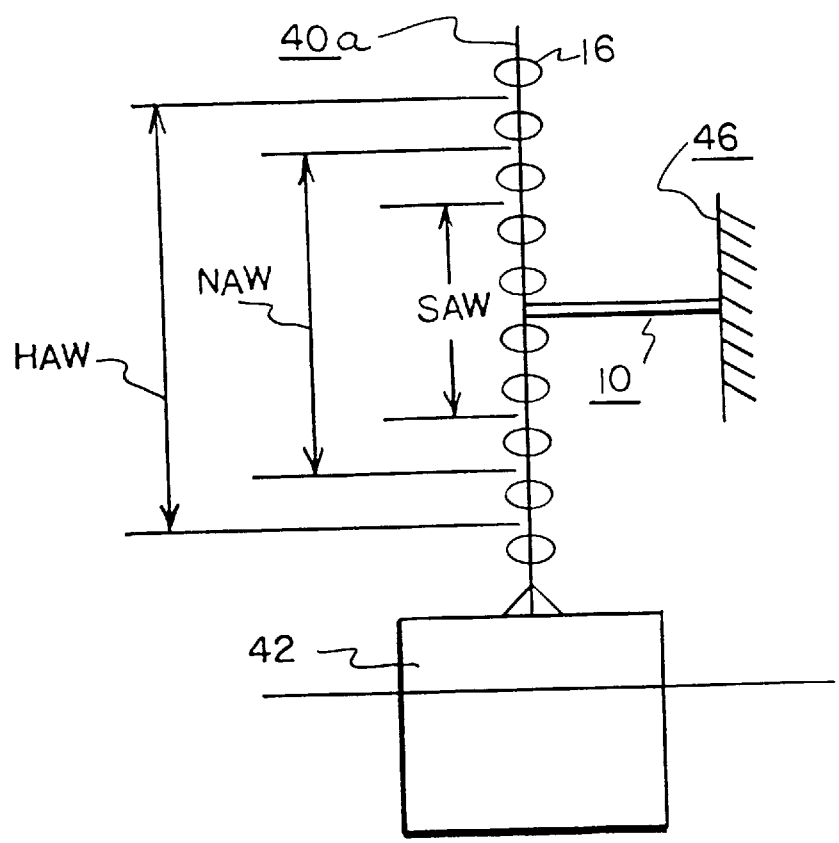

FIG. 12 illustrates a related advantage in connection with changing wave conditions. Thus, during the passage of waves of Normal Amplitude Waves (e.g., the waves most prevalent at a given location), those cams identified by the legend NAW engage and sequentially deflect the beam 10. Upon changes in the amplitudes of the passing waves, the only effect is that fewer or more cams are engaged, as identified by the legends SAW (small) and HAW (high), respectively, with no other adjustments required in the system.

Also, regardless of the heights of the waves (above a minimum height), the beam 10 is deflected an amount determined basically by the interaction of each cam with the beam, that is, the distance travelled by the beam end before it disengages from a cam. Thus, even in conditions of extremely high waves, only normal beam deflections occur and damage to the beam is avoided.

Another frequency multiplying effect is that, depending upon the characteristics of the beams, a released, depressed beam vibrates at its natural frequency until all its stored energy is dissipated or until it is contacted by a successive cam. The a.c. energy produced during such free vibration is at the frequency of the vibrations and can be relatively high in comparison with the frequency of the surface waves and the rate at which each beam is deflected. While dependent upon the particular use of the piezoelectric generating systems, in general, electrical energy collected from such systems should be impedance matched to the electrical load to obtain maximum efficiency power transfer. Piezoelectric power sources of the type herein described are capacitive, and higher frequency output voltages are more readily matched to typical electrical loads.

Accordingly, in a preferred embodiment, the cams 16 (e.g., FIG. 12) are spaced sufficiently far apart such that the deflected beams freely vibrate until substantially all the stored energy is consumed before the next cam arrives to contact the beam. For example, the beams can be allowed to freely vibrate until the amplitude of vibrations decays to around 10% of the original deflection.

Depending upon the beams used, a great range of frequencies is possible. In general, with presently contemplated beam contractions, beams having natural frequencies in the range of 60–150 Hz are readily available.

As described hereinafter, during free vibration of one or more beams, the continuously moving cam array (or arrays) engages other beams for maximum utilization of the available energy.

The simple beam-cam arrangement described leads to great flexibility in the design of useful structures.

Figure 13:
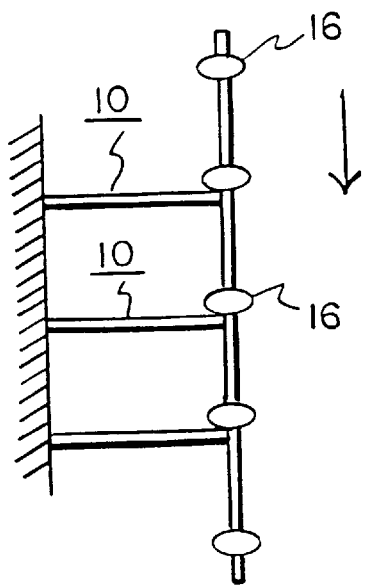
FIGS. 13 and 14 illustrate the deflections of multiple beams by multiple cams.

FIG. 13, for example, shows the use of multiple beams 10 successively engaged by the cams 16 of a single array of cams. As shown, the three beams illustrated are being simultaneously engaged by respective cams during a downward movement of the cam array relative to the beams 10. The three beams thus function as a single larger beam, but provide the advantage of smaller sized beams easier to manufacture, mount in place and replace as necessary.

Figure 14:
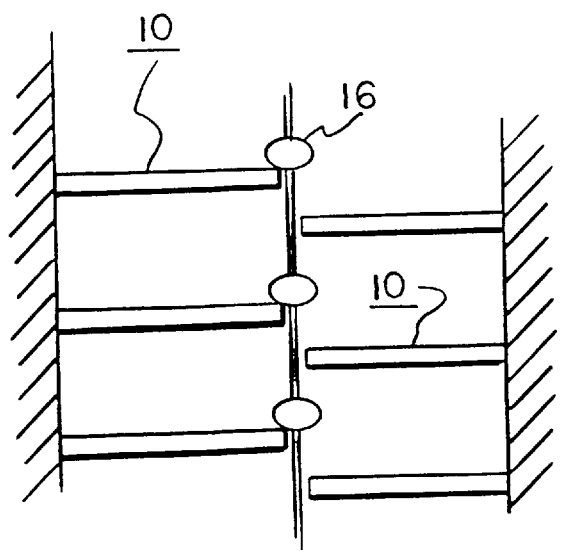

Because the three beams 10 shown in FIG. 13 are being simultaneously engaged, the force necessary to deflect them is three times the force necessary to deflect each. Where the force is being supplied by a raft floating on the surface of a body of water, the larger the force required, the larger, and more expensive, must be the raft. FIG. 14 shows a variation where six beams are deflected by a single array of cams 16, but where only three beams at a time are deflected. Thus, the same force as required in the FIG. 13 system is needed, but twice the number of beams are used. Again, greater flexibility in the design of the beams is provided.

FIGS. 15, 16 and 17 illustrate an arrangement for disposing a relatively large number of beams within a relatively small space.

FIG. 15 is a top view of the arrangement which includes a plurality of spaced apart, vertically extending supports 56 which, in this embodiment, comprise rectangular plates mounted, e.g., on an ocean floor, in spaced apart, parallel relationship. Each support 56 has mounted thereon, in spaced apart rows and columns, oppositely extending pairs of triangular beams 10a. FIG. 15, which can also be a horizontal section taken anywhere intermediate the vertical ends of the arrangement, shows eleven columns of pairs of beams, with each of the beam pairs in each column being in vertical alignment.

FIG. 17 shows the larger ends of each pair of oppositely disposed, triangular beams 10a fixed to a corresponding support 56, e.g., by snug fit within an opening through the support.

FIG. 17 also shows that the various beams 10a on each support 56 are coplanar with the beams on adjacent supports. Thus, as two arrays 60 and 62 of vertically spaced apart cams 16 move vertically relative to the beams, all the beams lying in a common horizontal plane are simultaneously engaged by a cam. The arrangement shown in FIG. 17 thus corresponds to the arrangement shown in FIG. 13. Also, in that each cam engages beams extending in opposite directions away from the cam, the FIG. 17 arrangement corresponds to the arrangement shown in FIG. 14 (except, in FIG. 17, the oppositely extending beams are co-planar).

For simplifying the drawing, FIGS. 15 and 16 do not show the cam arrays.

Figure 18:
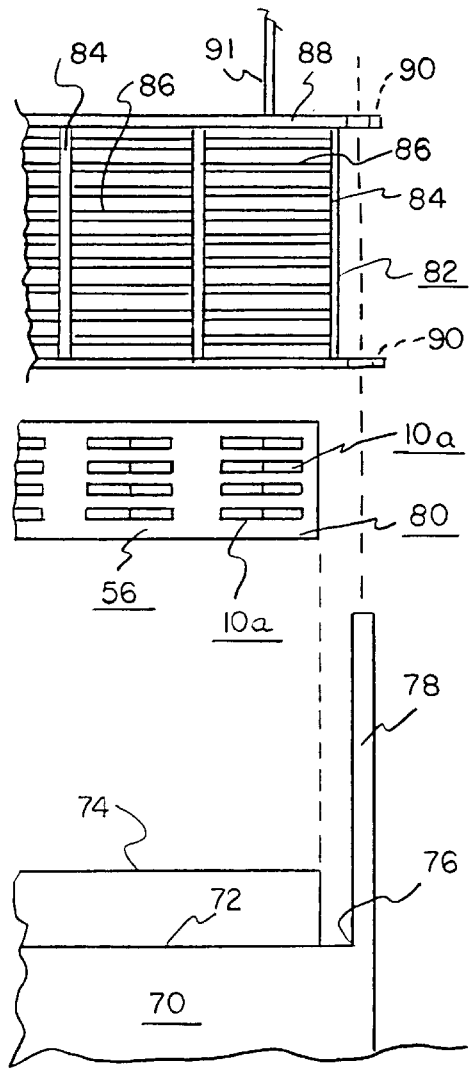
FIGS. 18 and 19 are exploded side elevational views, taken along orthogonal directions, of a system according to the invention for use within a body of water.
Figure 19:
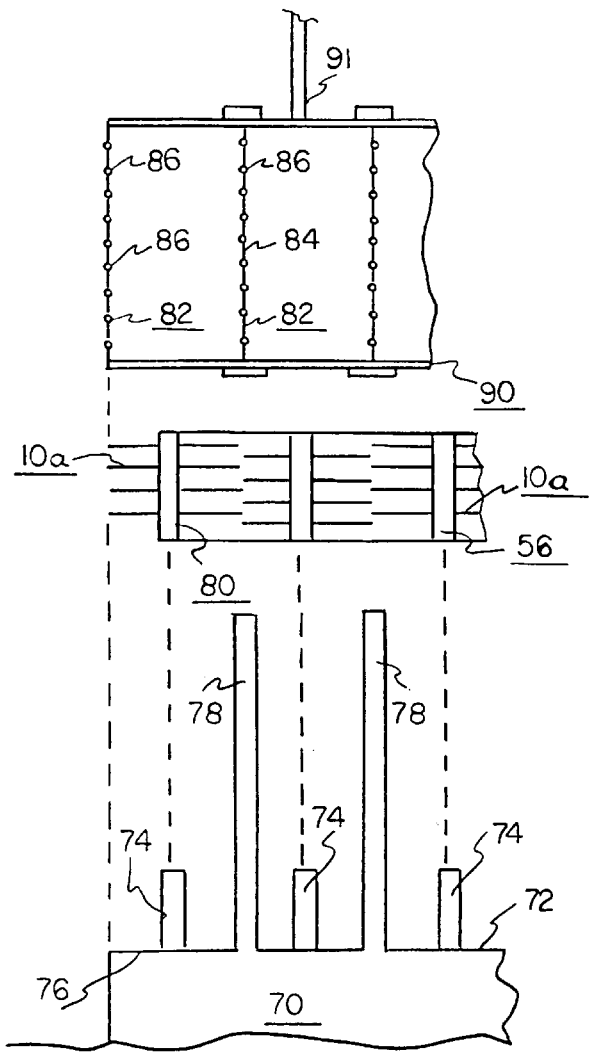

FIGS. 18 and 19 show an arrangement where arrays of beams and cams such as shown in FIGS. 15–17 are disposed within a body of water with the beam arrays being mounted on the floor of the water body. To this end, a mounting structure 70 is anchored to the water body floor, e.g., by virtue of its weight or using known anchoring means. The structure 70 comprises a platform having an upper surface 72 and a row of rigid walls 74 spaced along the surface. Along two opposite edges (only one edge 76 being shown) of the platform are disposed a plurality of columns 78, with each column 78 being disposed midway between a pair of walls 74. The walls 74 and columns 78 provide support for the arrays of beams and cams.

Each beam array 80 comprises a rigid support plate 56 mounting thereon columns of pairs of cantilevered beams 10a, with the beams 10a of each pair extending in opposite directions from the support plate 56. Each beam array 80 is fixedly mounted on a corresponding wall 74, and the mounted assembly of beams comprises a plurality of parallel, spaced apart beam supports 56, with columns of beams extending from each support towards an adjacent beam support. The arrangement illustrated in FIG. 19 is similar to that shown in FIG. 14 in that the beams from adjacent beam arrays are interdigitated relative to one another.

Each cam array 82 is a ladder like structure including side rails 84 and "rung" cams 86 extending between and secured to the rails 84. The vertical ends of the cam arrays 82 terminate in laterally extending plates 80 having openings 90 therethrough. Each cam array 82 is mounted on support columns 78 disposed on opposite sides of the support platform 70 for positioning each cam array 82 between a respective pair of beam arrays 80.

The ends of beams extending towards one another from adjacent arrays terminate more or less in a common vertical plane. The cam array is disposed within this vertical plane, and vertical movements of the cam arrays relative to the beam arrays cause engagements of the rung-like cams 86 on the cam arrays with the beam ends for causing deflections thereof.

The various cam arrays 82 are vertically slidable along the platform vertical columns 78, and the various cam arrays, all connected together by a common upper plate 88, are suspended by a cable 91 from a raft (not shown) floating on the surface of the water overlying the beam—cam assemblage.

In use, as the overlying float moves up and down in response to passing waves, the various cam arrays are also caused to vertically reciprocate thereby causing deflection of the cantilevered beams for generating electrical energy. The weight of the cam arrays is sufficient to cause deflections of the beams on the downward strokes.

As previously indicated, a particular advantage of the arrangement shown in FIGS. 18 and 19 is that all the piezoelectric power generating elements, i.e., the cantilevered beams 10a, are mounted on the floor of the water body, and none of the weight of the piezoelectric elements is supported by the overlying raft.

Figure 21:
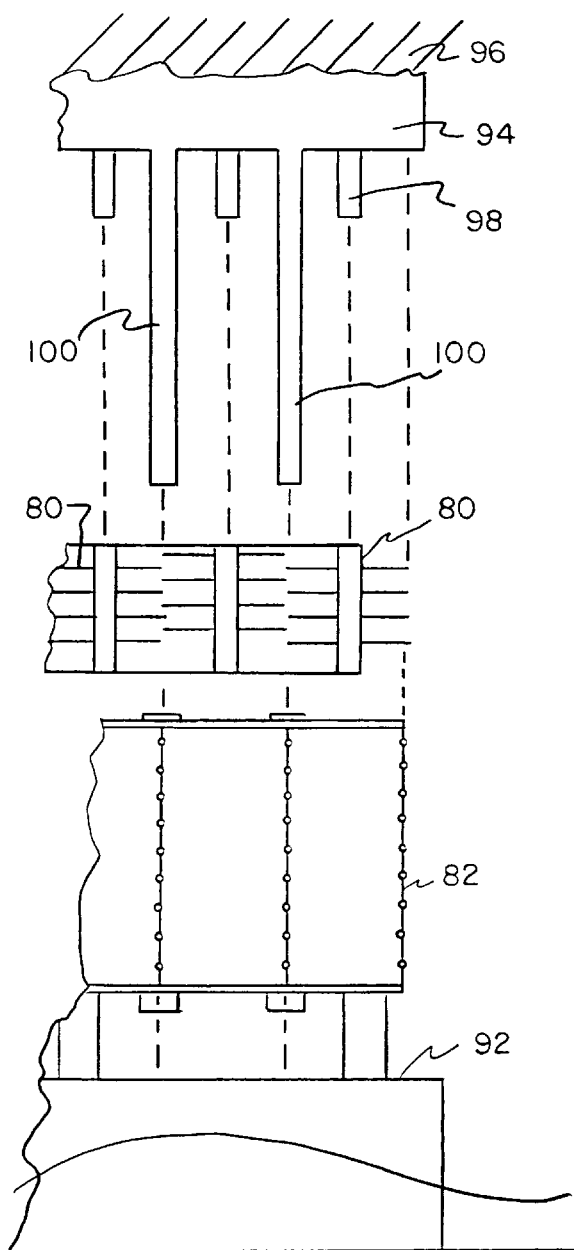
FIGS. 20 and 21 are views similar to FIGS. 18 and 19, respectively, but of an inventive system for use on the surface of and above a body of water.
Figure 20:
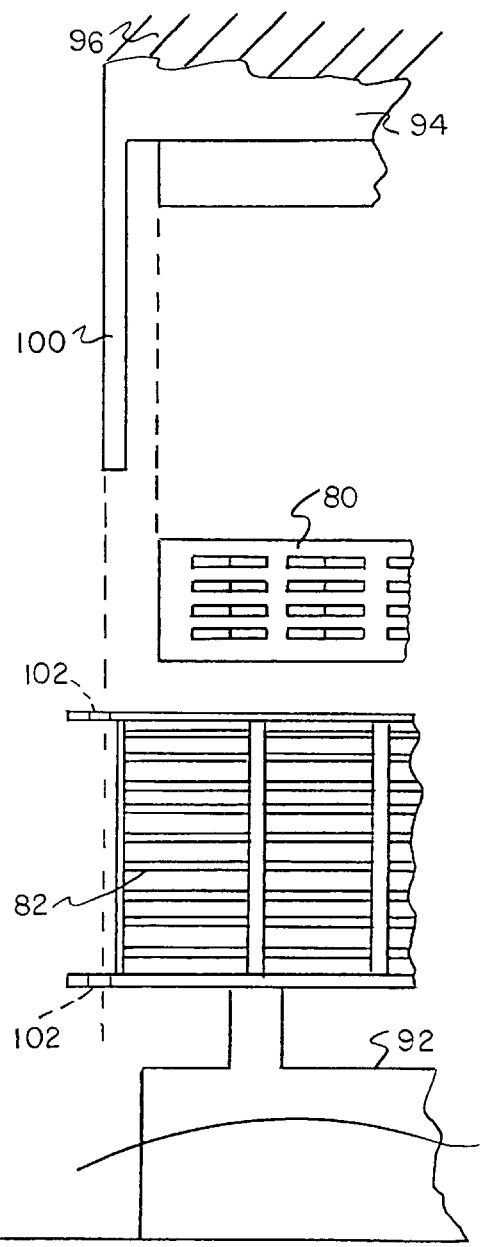

FIGS. 20 and 21 are generally similar to FIGS. 18 and 19, respectively, but show an arrangement where the cam and beam assemblage is disposed without the water body. Thus, as shown, the various cam arrays 82 are fixedly mounted on the upper surface 92 of a raft 42 floating on the surface of a body of water.

A support structure 94, similar to the support structure 70 shown in FIGS. 18 and 19, is mounted on the underside of some fixed structure 96 overlying the raft 42. The fixed structure 96 can be, for example, part of an oil drilling platform mounted on an ocean floor or part of a pier or the like.

Similarly as in FIGS. 18 and 19, a number of beam arrays 80 are fixedly secured to walls 98 of the support structure, and dependent columns 100 extend through openings 102 through laterally extending plates of the various cam arrays 82 for providing rails for guiding the vertical movements of the cam arrays in response to vertical movements of the raft. Except that the system is inverted, the system illustrated in FIGS. 20 and 21 functions similarly as the system illustrated in FIGS. 18 and 19.

In the embodiments illustrated in FIGS. 18–21, relative vertical movements between a floating raft and a fixed structure are utilized. In some instances, however, e.g., in deep water situations not adjoining ocean platforms, it is preferable not to use a fixed, ocean floor anchorage for providing the necessary relative vertical movements. Rather, separate objects reacting differently to passing waves are used.

For example, a catamaran (multiple hulls or outriggers) maintained pointed parallel to the direction of advance of the passing waves tends to remain relatively vertically stationary relative to the waves. Accordingly, if a simple raft is disposed adjacent to the catamaran (e.g., disposed between the hulls of a twin hulled craft), the raft will move vertically relative to the catamaran. Accordingly, by mounting, e.g., cam arrays on the raft and beam arrays on the catamaran, and with supporting structures such as shown in FIGS. 18–21 for maintaining an aligned relationship between the arrays, electrical energy is generated.

In another embodiment, a member having slight negative buoyancy is suspended beneath a raft by means of an elastic coupling. Then, as the raft rises and falls with the passing waves, the negative buoyancy member will oscillate relative to the raft. The mechanics of stretched spring, oscillating systems are well known, and various techniques disclosed in a co-pending application, filed Feb. 14, 1995, entitled "Piezoelectric Generation of Electrical Power From Surface Waves on Bodies of Water Using Suspended Weighted Members" on behalf of M. Y. Epstein, can be used. The co-pending application is also assigned to the assignee hereof, and the subject matter of the application is incorporated herein by reference.

In a further embodiment, a relatively massive first raft having only a slight positive buoyancy is used in connection with a freely floating second raft. Owing to its small buoyancy and large inertia (or, alternatively, relatively large size so as to overlap several passing waves), the first raft will remain relatively vertically stationary for providing vertical movements relative to the second raft.

What is claimed is:

1. A system for generating electrical energy comprising a first array of piezoelectric power generating elements spaced apart along a first direction, a second array of spaced apart engaging means, means for supporting said arrays in operative relationship to one another, means for causing relative movements between said arrays for causing said engaging means to move relative to said elements along said first direction for causing successive engagements of each of said engaging means with successive ones of said elements along said first direction for causing straining of and the generation of electrical energy by said elements, means for providing synchronous engagements of said engaging means with said elements, said first array of elements including first and second groups of elements, said second array of engaging means including first and second groups of engaging means, and said synchronous means causing all the engaging means of said first group of, engaging means to simultaneously engage respective ones of said first group of elements during a first time period and causing all the engaging means of said second group of engaging means to simultaneously engage respective ones of said group of elements during a second time period different from said first time period.

2. A system for generating electrical energy comprising a raft for floating on a surface of a body of water, a first piezoelectric power generator for converting straining of said generator to electrical energy, a support means for supporting a plurality of spaced apart cams for movement along a path intersecting said generator for causing deflection of said generator, means connected to said raft for causing movements of said cams relative to said generator along said path for causing successive cams to cause successive deflections of said generator, and the spacings between said cams being such that, with waves on said surface of preselected parameters, said generator, after each deflection thereof, freely vibrates at the natural frequency of oscillation of said generator for a period of time before the next, successive deflection of said generator.

3. A system according to claim 2 including a second power generator disposed relative to said first generator for being engaged and deflected by a cam during said period of time when said first generator is freely vibrating.

4. A system for generating electrical energy comprising a first array of spaced apart first elements, a second array of spaced apart second elements, means for supporting said arrays in operative relationship to each other, means for causing relative movements between said arrays for causing simultaneous engagement of each of said first elements with a respective one of said elements, said first elements being piezoelectric power generating elements the engagement of which by said second elements causing straining of and the generation of electrical energy by said first elements, and a third array of spaced apart first elements mounted in operative relationship to said second array, said movements causing means causing simultaneous engagement of all of said first elements of said first array with respective ones of said second elements during a first time period and causing simultaneous engagement of all of said first elements of said third array with respective ones of said second elements during a second time period different from said first time period.

5. A system according to claim 4 wherein said second elements are fixedly mounted relative to one another for common movements relative to said first and third arrays.

6. A system for generating electrical energy comprising first and second operatively associated support members subject to relative movements therebetween, first and second arrays of piezoelectric generators attached to said first support member for being strained in response to relative movements between said first and second members, said relative movements causing in-phase straining of all the generators of said first array of generators and in-phase straining of all the generators of said second array of generators, but out-of-phase straining of the generators of said first array relative to the generators of said second array.

7. A system according to claim 6 wherein each of said generators comprises a cantilevered beam of piezoelectric material having a first, free end and a second end secured to first said support member, and deflection means mounted on said second support member for causing deflections of said beams for causing said in-phase and out-of-phase strainings of said beams in response to said relative movements between said support members.

8. A system according to claim 7 wherein each of said beams has a cross-sectional area which increases from said free end towards said second end.

9. A system according to claim 7 wherein one of said support members is a float for floating on a body of water for vertical movements in response to passing surface waves, and the other of said support members is for being anchored to the floor of the water body at a position underlying said one support member.

10. A system according to claim 7 wherein one of said support members is a float for floating on a body of water for first vertical movements in response to passing surface waves, and the other of said support members is suspended from said float for second vertical movements different from said first vertical movements in response to passing waves causing said first vertical movements, the differences between said first and second vertical movements causing said relative movements between said support members.

11. A system according to claim 7 wherein one of said support members is a first float for floating on a body of water for first vertical movements in response to passing surface waves, and the other of said support members is a second float for floating on a body of water for second vertical movements different from said first vertical movements in response to passing waves causing said first vertical movements, the differences between said first and second vertical movements causing said relative movements between said support members.

* * * * *